May 26, 1925.
F. J. LONG ET AL
1,539,197
HEADLIGHT
Filed May 4, 1923     2 Sheets-Sheet 1
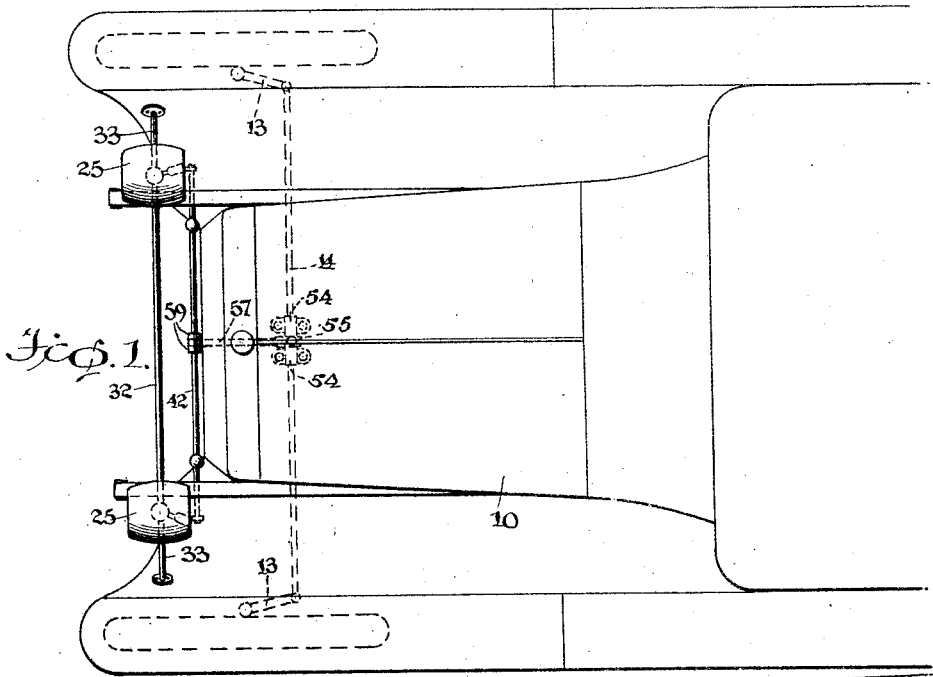
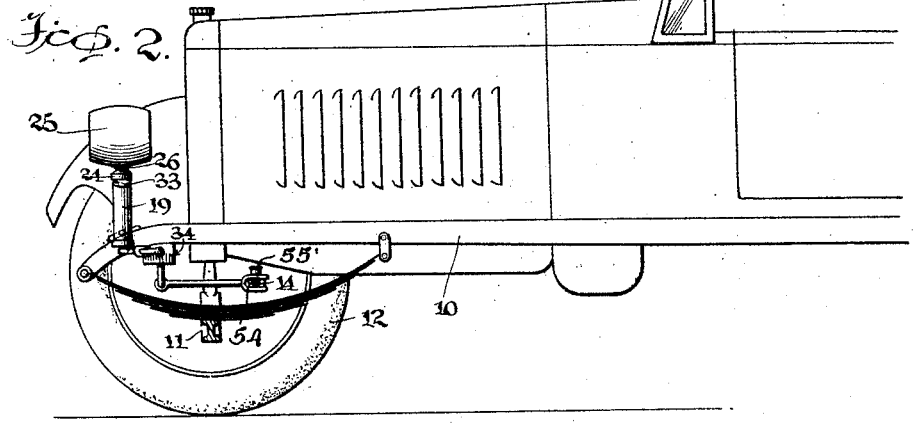
WITNESSES
INVENTORS
F. J. Long,
W. H. Emery,
BY
ATTORNEYS May 26, 1925.
F. J. LONG ET AL
HEADLIGHT
Filed May 4, 1923
1,539,197
2 Sheets-Sheet 2
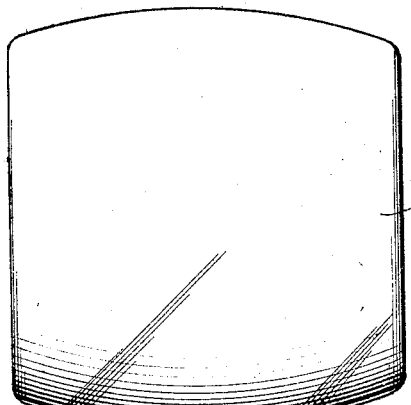
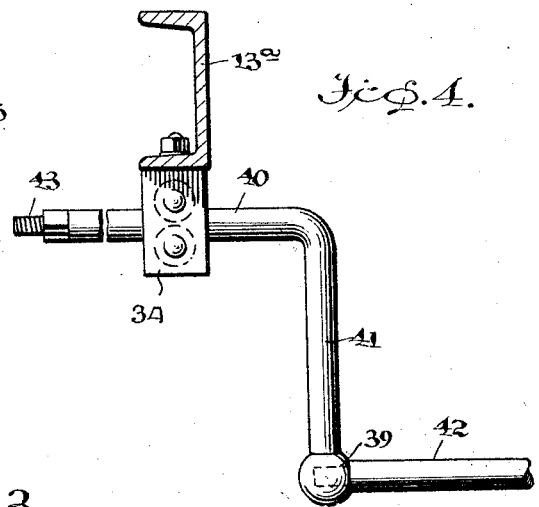
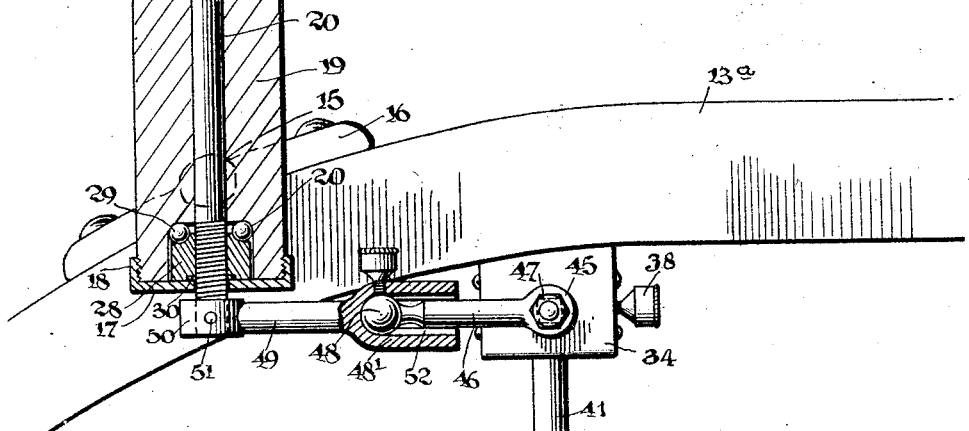
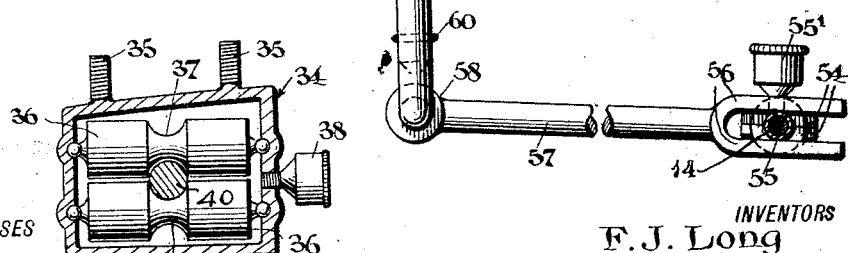
WITNESSES
R.E.Rousseau
INVENTORS
F.J. Long
W.H. Emory,
BY
Munn &co.
ATTORNEYS Patented May 26, 1925.

1,539,197

UNITED STATES PATENT OFFICE.

FRED J. LONG AND WILLIAM H. EMERY, OF CARBONDALE, COLORADO.

HEADLIGHT.

Application filed May 4, 1923. Serial No. 636,713.

*To all whom it may concern:*

Be it known that we, FRED J. LONG and WILLIAM H. EMERY, citizens of the United States, residing at Carbondale, in the county of Garfield and State of Colorado, have invented certain new and useful Improvements in Headlights, of which the following is a specification.

This invention relates to dirigible headlights for motor vehicles.

The present invention more particularly relates to operating means for dirigible headlights on motor vehicles, and has for its general object to provide mounting means for headlights of the above character which will permit free rotation of each headlight about its vertical axis, and to associate connecting or controlling means therewith whereby the headlights will be automatically operated by the steering mechanism of the associated motor vehicle in such a manner that the roadway immediately forward to the motor vehicle will at all times be illuminated.

It is also an important object of the invention that the operating means for the headlights be adapted to operate easily, that is, without any perceptible resistance and thus to insure that no strain upon the steering mechanism of the associated motor vehicle will occur for operating said headlights and also insuring that the headlights will at all times be brought into the correct position.

It is a further and important object of the invention that the headlights be mounted upon a motor vehicle in a substantial manner and so positioned that the same will not be submitted to any excessive vibration.

Other objects, and objects relating to details of construction, combination and arrangement of parts will hereinafter appear in the detailed description to follow.

The invention is illustrated by way of example in the accompanying drawings, in which:

Figure 1 is a top plan view of the front portion of a motor vehicle and showing the invention applied, Figure 2 is a side elevation of the same with one wheel removed showing the front axle in section, Figure 3 is a vertical sectional view taken through one of the standards or supports for a headlight and also showing in inner elevation the headlight and associated supporting and operating means therefor, Figure 4 is a detailed sectional view illustrating the manner in which the shiftable rods employed in connection with the controlling means for the headlights are supported by the frame of a motor vehicle, and Figure 5 is a transverse sectional view taken through the combined shiftable and supporting bearing employed for the shiftable rods used in connection with the operating mechanism.

Like reference numerals designate corresponding parts throughout the several views of the drawings.

Referring to the drawings more particularly, 10 indicates generally the body of a motor vehicle, 11 the front axle thereof and 12 the front wheels carried by said axle. Each wheel is connected to its axle with the usual steering knuckle and each knuckle is provided with the usual radius rod 13. The radius rods 13 have their free ends connected in the usual manner by a connecting rod 14.

In carrying out the invention there is provided a pair of bracket members 15, one for each of the headlights employed, and each bracket member being provided at its inner end with a suitable plate portion 16, whereby the same may be bolted upon the associated frame member 13ª. The other end of each bracket member 15 terminates in a supporting standard 19. The standard 19 in each instance is provided with a longitudinally extending bore adapted to journal a spindle 20. Also each standard 19 is provided at each end with a recess 21 which surrounds the spindle 20. In the upper recess 21 of the standard 19 there is disposed a collar 22, said collar being threaded upon the associated end of the spindle 20, and between this collar and the bottom of the recess 21 there are interposed ball bearings 23, whereby to facilitate turning movement of the spindle 20. A cap 24 is threaded upon the upper end of each standard 19. Also a cup 17 is similarly positioned upon the lower end of each standard. A pair of lamp casings 25 may be provided, one for each of the spindles 20, and each lamp casing should have formed therewith an exterior lug 26 which is provided with a threaded bore adapted to receive the upper end of the associated spindle. A suitable pin 27 may be utilized for holding the lamp 25 in each instance against movement with respect to its associated spindle 20. In the lower recess 20 of each standard 19 there is disposed a collar 28, similar to the collar 22 and between this collar and the inner wall of the recess there are interposed ball bearings 29. The collar 28 is threaded upon the lower end of the spindle 20 and a gasket 30 may be interposed between the lower end of the collar 28 and the cap 17. Any suitable oil openings may be provided whereby to lubricate the spindle 20 of each lamp construction. A rod 32 may be extended between the standards 19 in order to brace the same and also a brace may be extended between each fender of the motor vehicle and the associated standard 19, as indicated at 33, whereby to further brace these lamp casings.

Upon each side frame member 13ᵃ of the motor vehicle there is secured a boxing 34, said boxing being provided with threaded studs 35, whereby the same may be easily secured to the frame member 13ᵃ. Each boxing has positioned therein a pair of rollers 36 which are preferably rotatably supported, as illustrated to advantage in Figure 5, and each of which is provided with a central and annular groove 37, said grooves registering with each other, as shown. Also each boxing 34 carries a suitable grease cup 38.

A pair of L-shaped members 39 is provided, each L-shaped member having its one arm 40 extended through suitable openings in the associated boxing 34 and also extended between the rollers 37 of said boxing whereby to permit free longitudinal movement of this arm of the L-shaped member. The remaining portions 41 of the members 39 are connected at their free ends by a rod 42. The connections between the rod 42 and the members 39 may be of any conventional type to permit easy connecting and disconnecting of these members. Each member 39 has the free end of its portion 40 threaded, as at 43 (Fig. 4), and upon this threaded portion in each instance there is positioned the eye 45 of a crank arm 46, said crank arm being held in position by a suitable nut 47. Each crank arm 46 terminates at its free end in a ball 48 which is disposed in an elongated socket 48', said socket being formed at the free end of the connecting link or arm 49 carried by the lower end of the associated spindle 20. The arm 49 in each instance may be provided with a collar 50 which may be interiorly threaded and adapted to receive the associated spindle 20. Also each collar may be secured against rotating upon its spindle 20 by a pin or the like, as at 51. The elongated socket member 48' in each instance is provided with a pair of slots 52, said slots being diametrically disposed and adapted to permit the passage of the associated crank arm 46. The slots 52 are horizontally disposed in the socket member 48' so that the reciprocating movement of the arm 46 through the movement of the rod 42 will permit that portion of the arm between the ball 48 and the eye 45 to be moved through the slot when the arm 49 is rocked. This construction is necessary since the arm 46 is rigid on the rod 40 and movable in a horizontal plane while the arm 49, which is rigid with the shaft 20, must be rocked in order to rock said shaft. Upon the connecting rod 14 there is positioned a pair of clamping members 54, each clamp member being semi-circular in cross section and also provided with suitable bolting flanges, whereby the same may be secured to each other and also clamped upon the rod 14. As shown more particularly in Figure 1, a pair of these clamping members are located on the rod 14 and upon opposite sides of a pair of prongs 56 which receive the rod 14 and is formed upon the ends of a connecting link 57, said connecting link having its other end formed with a collar 58 which is adapted to receive the rod 42. The sleeve 55 is located on the rod 14 between the clamps 54 and is adapted to be engaged by the prong member 56 of the link 57 so that the wear of the prong will be upon the sleeve rather than upon the rod 14. Also a suitable collar 59 may be secured upon the rod 42 upon each side of the collar 58 on the rod 57, and thereby to hold the rod 57 in applied position. Also the collar 58 formed upon the link 57 may carry a grease cup 60 for an obvious purpose. A grease cup 55' mounted upon the prong 56 and as is usual threaded in a perforation through the top member of the prong is adapted to supply lubricant to the moving parts at this point.

The operation of the present invention is as follows: Assuming that the different operating means for the lamps 25 are connected as heretofore described and that the connecting rod 14 of the steering mechanism is shifted to turn the motor vehicle in a right hand direction. With this occurring the link 57 would be drawn in a similar direction to the movement of the rod 14. This link would transmit its movement through the members 46 and links 49 to the spindles 20 and rotate the lamps 25 about their vertical axis or with the spindles 20 in a direction corresponding to the turning of the motor vehicle. Upon the steering mechanism of the motor vehicle being operated to bring the front wheels to follow a straight line, then in an apparent manner the link 57 will again move to return the lamps 25 to their original position. The lamps would, of course, move in a corresponding manner should the vehicle be operated to turn to the left and it is obvious the lamps will at all times direct light immediately forward to the motor vehicle.

While we have shown and described the preferred form of our invention, we wish it to be understood that we are aware of the fact that the construction, combination and arrangement of parts may be changed by those skilled in the art without departing from the spirit of the invention, as indicated by the appended claims.

We claim:—

1. In combination, a motor vehicle having a steering mechanism including the usual steering knuckles and connecting rods therebetween, shafts rotatably mounted on the vehicle, a pair of headlights rigid with said shafts, a rock arm rigid with each shaft, the free end of the rock arm being provided with a sleeve, a socket at the inner end of the sleeve, said sleeve being provided with slots, a rod having a ball mounted in the socket of each sleeve with the rod movable through the slots in a respective sleeve, a rod disposed transversely of the motor vehicle and longitudinally shiftable, and means connecting the end of said rod with the ball equipped rods, and means connecting the transversely disposed rod with the connecting rod associated with the steering knuckles.

2. In combination, a motor vehicle having a steering mechanism including the usual steering knuckles and connecting rods therebetween, shafts rotatably mounted on the vehicle, a pair of headlights rigid with said shafts, a rock arm rigid with each shaft, the free end of the rock arm being provided with a sleeve, a socket at the inner end of the sleeve, said sleeve being provided with slots, a rod having a ball mounted in the socket of each sleeve, with the rod movable through the slots in a respective sleeve, a rod disposed transversely of the motor vehicle and longitudinally shiftable, an L rod connecting an end of the transverse rod with the free end of the ball equipped rod, a bearing mounted in a fixed position and adapted to slidably receive one arm of the L-shaped rod, and means connecting the transversely disposed rod with the connecting rod associated with the steering knuckles.

FRED J. LONG.
WILLIAM H. EMERY.